US012673439B2

(12) United States Patent
Galanis et al.

(10) Patent No.: US 12,673,439 B2
(45) Date of Patent: Jul. 7, 2026

(54) BLADE MASKING FOIL

(71) Applicant: Bic Violex Single Member S.A., Anoixi (GR)

(72) Inventors: Christos Galanis, Anoixi (GR); Dimitrios Efthimiadis, Anoixi (GR); Ioannis Malliaros, Anoixi (GR); Anestis Tsegenidis, Anoixi (GR); Dimitrios Sioulas, Anoixi (GR)

(73) Assignee: Bic Violex Single Member S.A., Anoixi (GR)

( * ) Notice: Subject to any disclaimer, the term of this patent is extended or adjusted under 35 U.S.C. 154(b) by 694 days.

(21) Appl. No.: 17/804,653

(22) Filed: May 31, 2022

(65) Prior Publication Data

US 2022/0379507 A1 Dec. 1, 2022

(30) Foreign Application Priority Data

May 31, 2021 (EP) .................................... 21176851

(51) Int. Cl.
*B26B 21/40* (2006.01)
*B26B 21/22* (2006.01)

(52) U.S. Cl.
CPC ........ *B26B 21/4075* (2013.01); *B26B 21/225* (2013.01); *B26B 21/4037* (2013.01)

(58) Field of Classification Search
CPC .............. B26B 21/225; B26B 21/4075; B26B 21/4037; B26B 21/4006; B26B 21/4012; B26B 21/4031
USPC ...................................................... 30/78, 532
See application file for complete search history.

(56) References Cited

U.S. PATENT DOCUMENTS

| | | | | |
|---|---|---|---|---|
| 11,117,280 B2 * | 9/2021 | Zucker | B26B 21/22 | |
| 2011/0146079 A1 * | 6/2011 | Clarke | B26B 21/4012 30/34.05 | |
| 2018/0354146 A1 * | 12/2018 | Brellis | B26B 21/4012 | |
| 2019/0255720 A1 * | 8/2019 | Galanis | B26B 21/4037 | |
| 2020/0230835 A1 * | 7/2020 | Athanasiou | B26B 21/526 | |

FOREIGN PATENT DOCUMENTS

| | | |
|---|---|---|
| FR | 2599657 A1 | 12/1987 |
| WO | 2014119808 A1 | 8/2014 |
| WO | 2018019951 A1 | 2/2018 |

OTHER PUBLICATIONS

Extended European Search Report issued in European Patent Application No. 21176851.0, dated Nov. 12, 2021.

* cited by examiner

*Primary Examiner* — Evan H Macfarlane
*Assistant Examiner* — Robert D Cornett
(74) *Attorney, Agent, or Firm* — Bookoff McAndrews, PLLC

(57) ABSTRACT

A masking foil for a shaving cartridge comprising a front side, a back side, a pair of lateral sides, at least one ribbon extending along a top side of the masking foil between the front side and the back side, and a first securing portion located at one of the pair of lateral sides. The first securing portion comprises a cross-member extending along the top side of the masking foil between the front side and the back side, and at least two securing elements extending laterally outwardly from the cross-member.

20 Claims, 6 Drawing Sheets

BLADE MASKING FOIL

CROSS REFERENCE TO RELATED APPLICATION

This application claims priority from European Patent Application EP21176851.0, filed on May 31, 2021, the entire contents of which being incorporated herein by reference.

TECHNICAL FIELD

The present disclosure relates to blade masking foils, shaving cartridges and shaving razor assemblies.

BACKGROUND

Safety razors having a shaving cartridge (also known as shaving head or safety razor cartridge) that is permanently or removably attached to a razor handle, and wherein the shaving cartridge comprises a housing, one or more blade(s) having a blade edge and a masking foil or a blade shield that partially covers the blade edge(s) have been known for some time. The masking foils or blade shields are used to provide added protection for the skin of the user during shaving. They also allow to provide a hair alignment that decreases the hair-cutting force during shaving. As known, such a masking foil has flat and wide securing portions at its side edges. These securing portions are placed at side edges of the shaving cartridge between the blade edges and the blade retainer (also known as clip). Generally, such masking foil is assembled during production of the shaving cartridge. When the masking foil is assembled in the shaving cartridge (or shaving head) after production, then the blade(s) that are supported in the housing of the shaving cartridge by pre-stressed spring members (e.g., pre-stressed fingers) are additionally pressed at a distance equal to the thickness of the masking foil. Consequently, the blade edges become less exposed in relation to the shaving plane of the razor, which affects the efficiency of the shaving performance. Additionally, the spring fingers are more intensely stressed, which makes them less sensitive to elastic deformation due to the shape of the skin to be shaved. Moreover, due to the securing portions of the masking foil (or blade shield) situated between the blade edges and the retainer, in case the masking foil is made of a non-conductive material, the cathodic protection offered by the retainer (which can for example be made of aluminium) to the blades can be lost.

The performance of the safety razor, and particularly of the shaving head may be further improved.

SUMMARY

According to a first aspect, a masking foil for a shaving cartridge is provided. The masking foil comprises a front side, a back side, a pair of lateral sides, at least one ribbon extending along a top side of the masking foil between the front side and the back side, and a first securing portion located at one of the pair of lateral sides. The first securing portion comprises a cross-member extending along the top side of the masking foil between the front side and the back side, and at least two securing elements extending laterally outwardly from the cross-member. The securing portion of the masking foil allows for a proper and resistant assembly of the masking foil into the cartridge.

The at least one ribbon may comprise a front bent portion extending from the ribbon downwardly at the front side, and a back bent portion extending from the ribbon downwardly at the back side. The bent portions have the advantage to provide a certain rigidity to the masking foil.

The masking foil may further comprise a front anchorage area located at the front side, and a back anchorage area located at the back side, wherein the front bent portion of the at least one ribbon is connected to the front anchorage area, and wherein the back bent portion of the at least one ribbon is connected to the back anchorage area.

In addition or alternatively, the masking foil may comprise a second securing portion located at the other one of the pair of lateral sides, wherein the second securing portion comprises a cross-member extending along the top side of the masking foil between the front side and the back side, and at least two securing elements extending laterally outwardly from the cross-member.

The cross-member of any of the first and/or second securing portion may comprise two joining members, wherein the two joining members are configured to respectively connect the cross-member to the front anchorage area and to the back anchorage area. The joining members have the advantage to provide a certain rigidity to the securing portion(s).

The securing elements may be in the form of fins, fingers, pins, tongues or any other form of the like. Further, the securing elements may be bent upwardly to form an angle $\Omega_u$ with the top side of the masking foil. The angle $\Omega_u$ may be in a range of 0° to 10°, particularly in a range of 0.05° to 8°, more particularly in a range of 0.1° to 5°. In addition or alternatively, the securing elements may be bent downwardly to form an angle $\Omega_d$ with the top side of the masking foil. The angle $\Omega_d$ may be in a range of 0° to 10°, particularly in a range of 0.05° to 8°, more particularly in a range of 0.1° to 5°. In addition or alternatively, the securing elements may be elastically deformable in an up-and-down direction. This may allow the masking foil to be assembled and held in place in the shaving cartridge. A width of the securing elements may be in a range of 0.4 mm to 6 mm, particularly in a range of 1 mm to 4 mm, more particularly in a range of 1.2 mm to 2.2 mm. A length of the securing elements may be in a range of 0.5 mm to 10 mm, particularly in a range of 0.7 mm to 8 mm, more particularly in a range of 1 mm to 6 mm.

The masking foil may be made of a conductive and/or non-conductive material selected from a group consisting of stainless steel, plastic material, composite, aluminium, aluminium alloys, noble metals, and/or any combination thereof. In addition or alternatively, the masking foil may comprise a wound healing and/or an antibacterial agent. In addition or alternatively, the masking foil may comprising a lubricating coating. This coating may provide a reduction of the friction between the shaving cartridge and the skin.

According to a second aspect, a shaving cartridge is provided. The shaving cartridge comprises a housing, at least two blades, a first retainer and a masking foil. The housing comprises a top surface, a bottom surface, a front edge, a rear edge and a pair of side edges extending between the front edge and the rear edge. The at least two blades are disposed between the front edge and the rear edge. Each of the at least two blades comprises a cutting edge extending toward the top surface and at an angle toward the front edge. The at least two blades are movable in an up-and-down direction in the housing. Further, the spacing between the two adjacent cutting edges defines an inter-blade span IBS. The first blade retainer is located at one of the pair of side edges, toward the top surface and is configured to cover the at least two blades such as to retain the at least two blades in the housing. The masking foil corresponds to the masking foil described above. The front side is disposed in front of the cutting edges toward the front edge, and the back side is disposed in back of the cutting edges toward the rear edge. The at least one ribbon and the first securing portion at least partially cover the cutting edges of the at least two blades. The front bent portion and the back bent portion are directed toward the bottom surface. The at least two securing elements are configured to be inserted below the first blade retainer such as to maintain the masking foil in the housing. Further, at least one of the at least two securing elements is configured to be inserted in the inter-blade span. The other one of the at least two securing elements may be configured to be arranged in the back of the cutting edge of the blade which is arranged close to the rear edge.

An advantage with the current masking foil is that a way of securing the masking foil without affecting blade edges exposures or the springs pre-stressing is provided. This is particularly useful in the cases in which a blade masking foil is to be assembled in a current production shaver head that includes blades as described herein, i.e. blades welded on a bent support or bent blades that are supported or not on spring fingers. Additionally, the securing portion allows for a proper assembly of the masking foil into the cartridge. Moreover, the shaving cartridge according to the disclosure may create a special skin sliding surface that may alter the skin flow before the cutting edge.

The cutting edges may be configured to get in contact with a bottom surface of the first blade retainer.

Further, the masking foil may comprise a second blade retainer located at the other one of the pair of side edges, toward the top surface and configured to cover the at least two blades such as to retain the at least two blades in the housing. The cutting edges may be configured to get in contact with a bottom surface of the second blade retainer.

The masking foil may be removably assembled within the housing of the shaving cartridge. In addition or alternatively, the securing elements may be configured to be elastically deformable such as to spring-mount the masking foil in the housing.

The number of securing elements extending from the cross-member of the first securing portion may be at maximum equal to the number of blades. In addition or alternatively, the number of securing elements extending from the cross-member of the second securing portion may be at maximum equal to the number of blades. Further, the number of securing elements of the first securing portion and the number of securing elements of the second securing portion may be equal. Alternatively, the number of securing elements of the first securing portion and the number of securing elements of the second securing portion may be different.

According to a third aspect, a shaving razor assembly comprising a shaving handle and a shaving cartridge as described above is provided.

DESCRIPTION OF THE DRAWINGS

Additional characteristics and advantages of the disclosure will be described with reference to the following figures in which.

On different figures, the same reference signs designate identical or similar elements.

DETAILED DESCRIPTION

Figure 1:
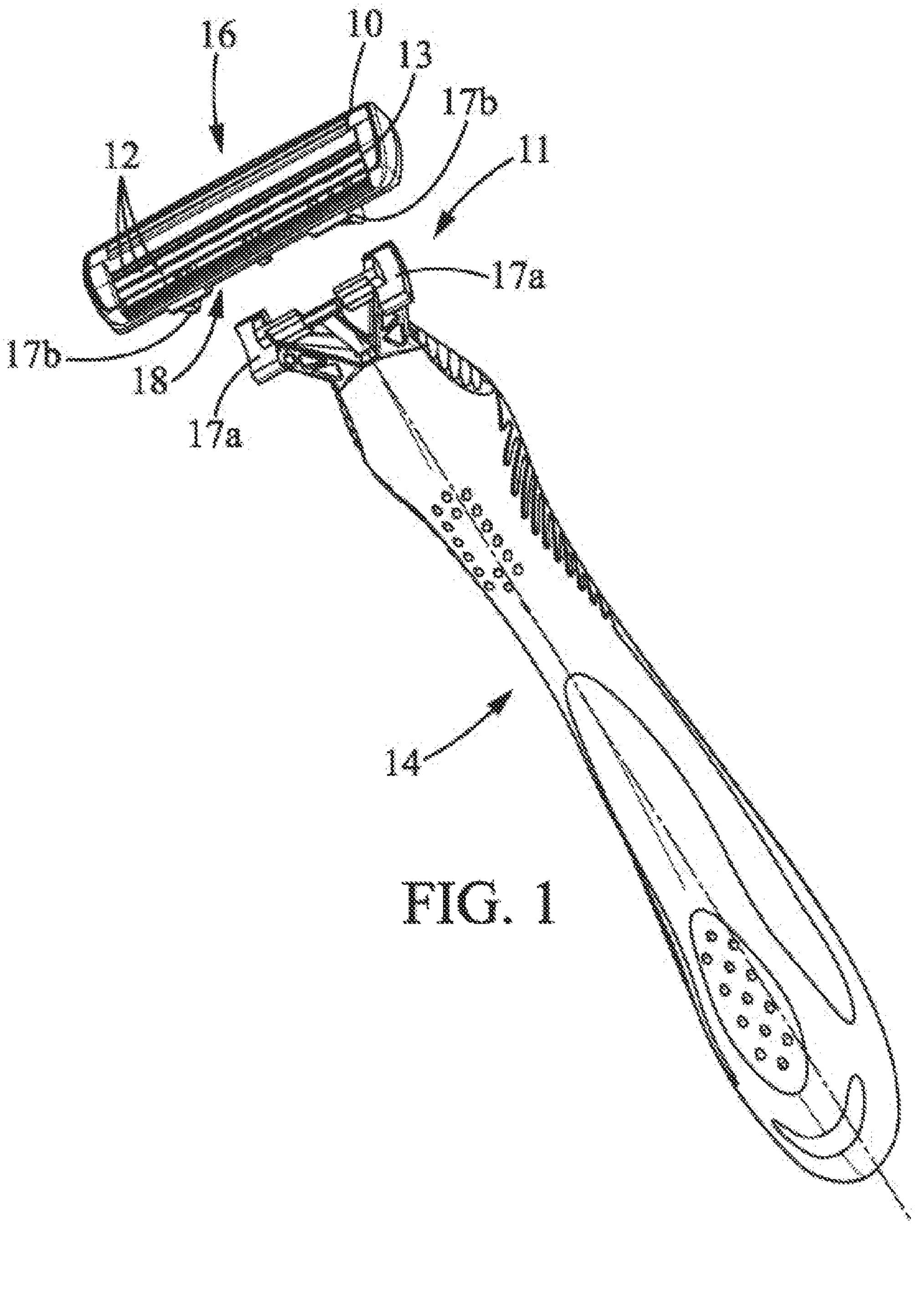
FIG. 1 is a perspective view of a wet shaving razor (e.g. a wet shaving razor), comprising a shaving cartridge according to the disclosure.

FIG. 1 illustrates a shaving razor, for example a wet shaving razor, having a shaving cartridge 10 connected to a razor handle 14. The shaving cartridge 10 may be detachably connected to the razor handle 14 in order to be removed when the blade edges are dulled. In other examples, the shaving cartridge may be permanently attached to the razor handle, and the whole shaving razor is to be thrown away. The shaving cartridge 10 comprises three blades 12. In other examples, the number of blades may vary and can be more than three blades. As shown in FIG. 1, the bottom surface 18 of the shaving cartridge 10 includes two connecting members or rearwardly protruding connectors, i.e., two inwardly facing arcuate arms 17*a* shaped in correspondence with and adapted to receive lateral edges of shell bearing 17*b* provided onto the handle 14 for pivotally mounting the shaving cartridge 10 onto the handle 14.

Figure 2:
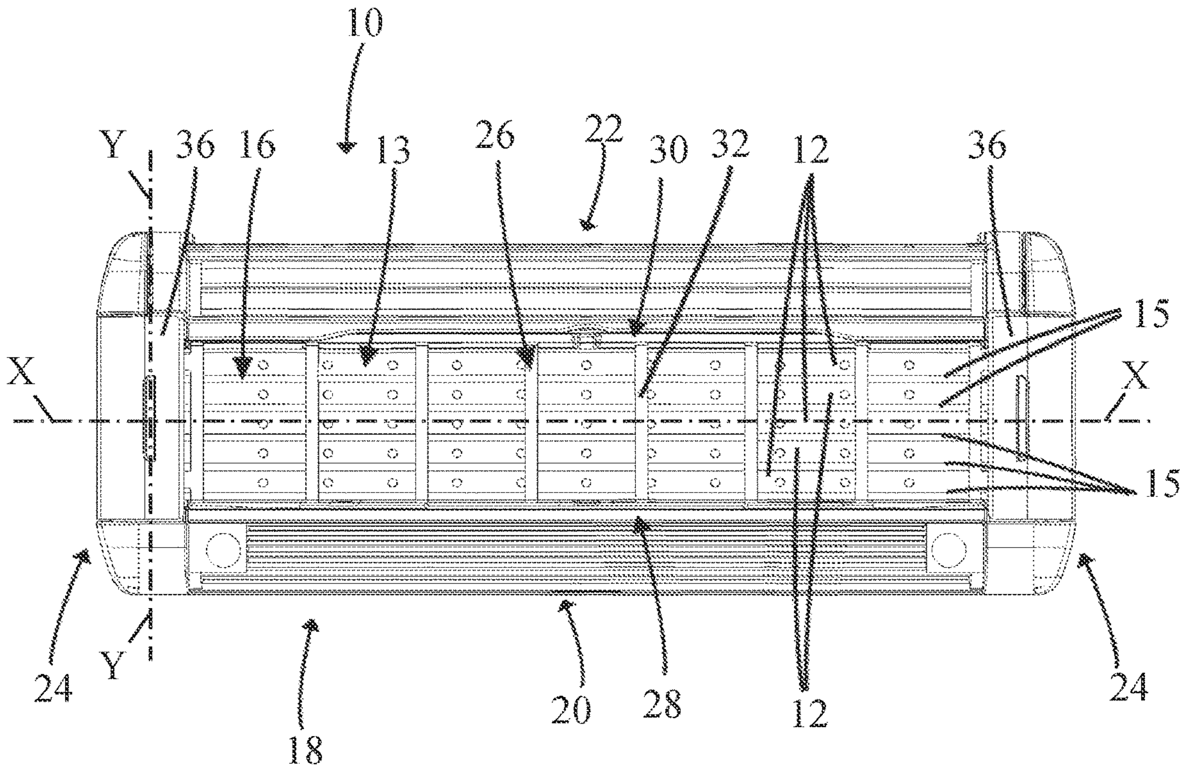
FIG. 2 is a top view of a shaving cartridge according to the disclosure.
Figure 3:
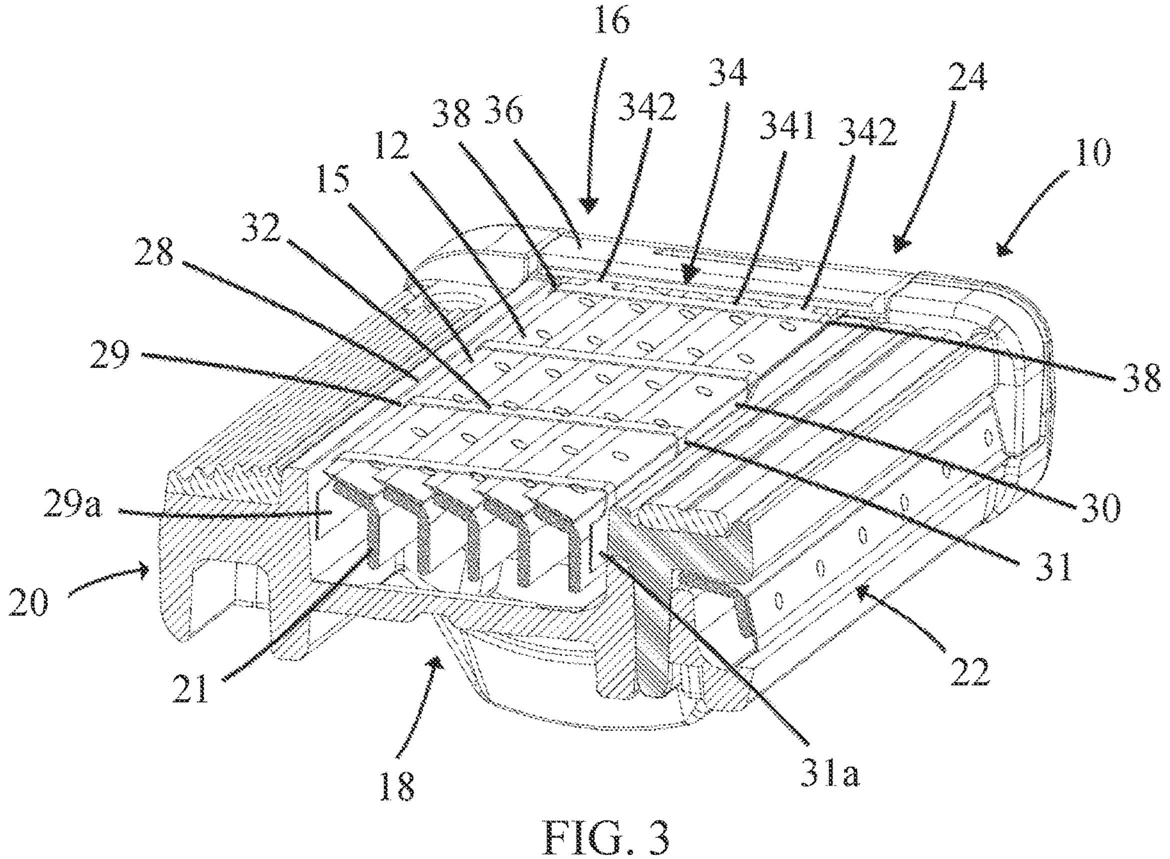
FIG. 3 is a cross-section in a perspective view of the shaving cartridge of FIG. 2.

As best shown in FIGS. 2 and 3, the shaving cartridge 10 comprises a housing 13 that comprises a top surface 16, a bottom surface 18, a front edge 20, a rear edge 22, and a pair of side edges 24 extending between the front edge 20 and the rear edge 22. The shaving cartridge 10 also comprises at least two blades 12 (here five blades 12) disposed between the front edge 20 and the rear edge 22, a first blade retainer 36 and a masking foil 26 that partially covers the cutting edge 15 of the blades 12. The number of blades is not limited to a certain number and can be more than two and even more than five blades, but at least two. The blades are movable in an up-and-down direction parallel to a Z-Z axis (depicted in FIG. 9) in the housing 13 (alternatively, in some examples, the blades may be non-movably arranged in the housing). Each of the blades 12 has a cutting edge 15 extending toward the top surface 16 and at an angle toward the front edge 20. The cutting edges 15 of the blades 12 are parallel to an axis X-X. The spacing between two adjacent cutting edges 15 defines an inter-blade span IBS, which is further described below. The first blade retainer 36 is located at one of the pair of side edges 24, toward the top surface 16 and configured to cover the blades 12 such as to retain the blades 12 in the housing 13. The masking foil 26 according to the present disclosure is further described below with reference to FIGS. 6 and 7.

Figure 10:
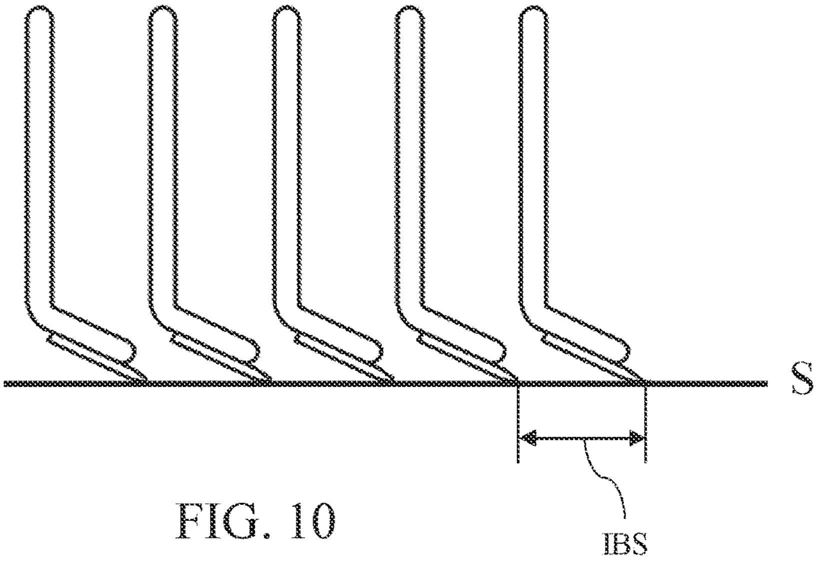
FIG. 10 is a schematic view of a blade arrangement.

In other examples not shown, the masking foil may partially cover only a certain number of adjacent blades and leave the remaining blades uncovered. The uncovered blades may increase the shaving efficiency. The difference between a cutting edge surface partially covered and a cutting edge surface uncovered by the masking foil may cause two different exposures of the cutting edge. The exposure of a cutting edge is the distance of the cutting edge from the shaving plane S. The shaving plane S is defined as the tangential line intersecting the first and second skin contact points (see FIG. 10). More simply, the shaving plane may be approximated as a line between the highest points on the skin-contacting surfaced of a shaving cartridge. Movement of the razor handle causes the blades of the shaving cartridge to be moved across the shaving plane in the shaving direction, enabling the blades to remove unwanted hair.

In other examples not shown in the figures, the shaving cartridge may comprise multiple masking foils, wherein the multiple masking foils can be adjacent to one another or be separated by at least one blade and wherein one masking foil may partially (or fully) cover the cutting edges of two or more blades. For example, a first masking foil may partially (or fully) cover the cutting edges of two out of five blades while a second masking foil may partially (or fully) cover the remaining three out of five blades. Alternatively, the second masking foil may cover the cutting edges of only two adjacent remaining blades. In addition or alternatively, a third masking foil may cover the cutting edge of the remaining blade out of the five. Any other coverage configuration of the blades by one or multiple masking covers may be possible.

Figure 6:
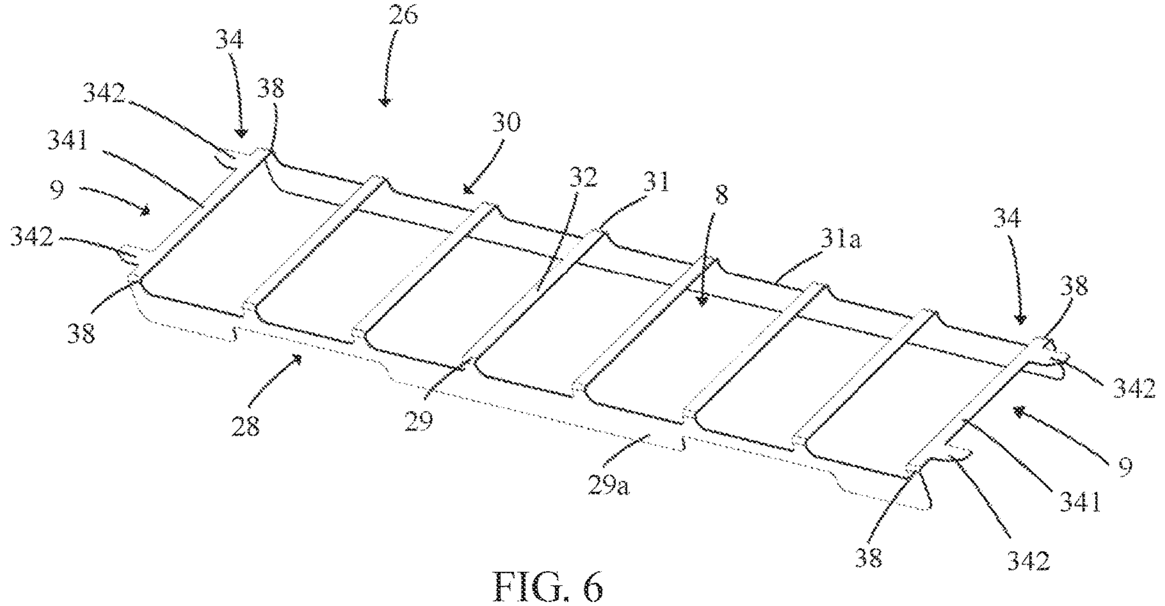
FIG. 6 is a perspective view of a masking foil according to the disclosure.
Figure 7:
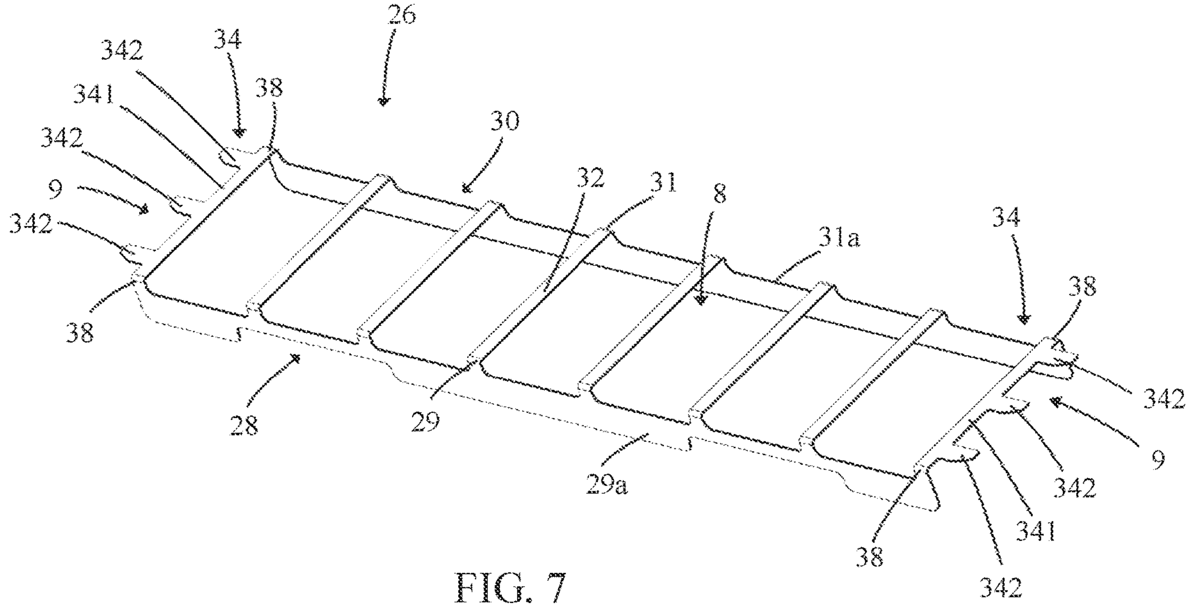
FIG. 7 is a perspective view of another example of a masking foil.

FIG. 6 illustrates a masking foil 26 for a shaving cartridge 10 according to the present disclosure. The masking foil 26 comprises a front side 28, a back side 30, a pair of lateral sides 9, at least one ribbon 32 extending along a top side 8 of the masking foil 26 between the front side 28 and the back side 30, and a first securing portion 34 located at one of the pair of lateral sides 9. The first securing portion 34 comprises a cross-member 341 extending along the top side 8 of the masking foil 26 between the front side 28 and the back side 30, and at least two securing elements 342 extending laterally outwardly from the cross-member 341. In another example shown in FIG. 7, the first securing portion 34 may comprise three securing elements 342. In other examples not shown, the first securing portion may comprise more than three securing elements. As shown in FIGS. 6 and 7, the masking foil 26 may also comprise a front bent portion 29 extending from the ribbon 32 downwardly at the front side 28, and a back bent portion 31 extending from the ribbon 32 downwardly at the back side 30. The bent portions have the advantage to provide a certain rigidity to the masking foil. The masking foil 26 may further comprise a front anchorage area 29*a* located at the front side 28 and a back anchorage area 31*a* located at the back side 30. The front bent portion 29 of the at least one ribbon 32 may be connected to the front anchorage area 29*a*, and the back bent portion 31 of the at least one ribbon 32 may be connected to the back anchorage area 31*a*. FIGS. 2, 4, 6 and 7 for instance show masking foils with six ribbons. Anyway, the number of ribbons is not limited to one or six but may be any number that the masking foil is technically capable to comprise.

As illustrated in FIG. 6, the masking foil 26 may further comprise a second securing portion 34 located at the other one of the pair of lateral sides 9, wherein the second securing portion 34 may comprise a cross-member 341 extending along the top side 8 of the masking foil 26 between the front side 28 and the back side 30, and at least two securing elements 342 extending laterally outwardly from the cross-member 341. In another example shown in FIG. 7, the second securing portion 34 may comprise three securing elements 342. In other examples not shown, the second securing portion may comprise more than three securing elements.

As can be seen in FIGS. 6 and 7, each of the cross-members 341 may comprise two joining members 38 configured to respectively connect the cross-member 341 to the front anchorage area 29*a* and to the back anchorage area 31*a*. The joining members 38 may allow a connection between the securing portion 34 and the remaining members of the masking foil 26. The joining member have the advantage to provide a certain rigidity to the securing portion.

The securing elements 342 as depicted in FIGS. 6 and 7 are in the form of fins (or have thin finger-like shapes) extending laterally outwardly from the cross-member 341. The securing elements may alternatively be in form or fingers, pins, tongues and/or in any other form of the like. The free end of the securing members can be round, bevelled, sharp, tapered, squared or any other form. Further, the securing elements 342 may be bent upwardly to form an angle $\Omega_u$ with the top side 8 of the masking foil 26. The angle $\Omega_u$ may be in a range of 0° to 10°, particularly in a range of 0.05° to 8°, more particularly in a range of 0.1° to 5° (the angle values are expressed in absolute values). In addition or alternatively, the securing elements 342 may be elastically or plastically deformable in the up-and-down direction (parallel to the Z-Z axis, shown in FIG. 9) such as for example to build spring elements and/or fixation elements. Alternatively, the securing elements 342 may be bent downwardly to form an angle $\Omega_d$ with the top side 8 of the masking foil 26. The angle $\Omega_d$ may open from the top side 8 in the opposite direction than the angle SI' and may be in a range of 0° to 10°, particularly in a range of 0.05° to 8°, more particularly in a range of 0.1° to 5° (the angle values are expressed in absolute values). The downward inclination of the securing members may permit to locate the securing elements below the blade retainer without requiring any elastic nor plastic deformation of the securing elements at their junction with the cross-member during the assembly process of the foil into the housing. In fact, the shaving cartridge is designed such that the cutting edges of the blades get into contact with the bottom surface of the blade retainer (e.g. to benefit from cathodic protection). To allow this contact, and in order to avoid having a gap between the cutting edges and the blade retainer corresponding e.g. to the thickness of the masking foil (particularly corresponding to the thickness of the securing portion) when assembled, the securing elements may need to be bent downwardly and/or at least need to be deformable such that they may be bend downwardly during assembly. With this, the securing elements can be inserted below the bottom surface of the blade retainer while allowing a contact between the cutting edges of the blades and the bottom surface of the blade retainer.

The thickness of the securing elements 342 may be measured from the top surface to the bottom surface of the securing element. The thickness can be between 20 μm and 5000 μm. In particular, the thickness may be between 40 μm and 60 μm. The thickness may be for example of about 50 μm. The securing elements may all have the same thickness or different thicknesses depending on their location on the cross-member and within the housing and depending on the efforts they have to resist in usage. Similarly, the thickness of the cross-member 341 may be measured from the top surface to the bottom surface of the cross-member. Ideally, the thickness of the cross-member may be equal to the thickness of the securing elements (i.e., between 20 μm and 5000 μm, in particular between 40 μm and 60 μm, more particularly of about 50 μm). Alternatively, the thickness of the cross-member may be different than the thickness of the securing element(s). The length of the securing elements between the junction with the cross-member and the free end may be comprised between 0.5 mm and 10 mm, particularly between 0.7 mm and 8 mm, more particularly between 1 mm and 6 mm, preferably about 1.25 mm. All securing elements may have the same length or, alternatively, have different lengths depending on the location in the housing, e.g., with relation to the blades and/or the blade retainer. The width of a cross-member measured between the lateral sides of the cross-member may be comprised between 0.2 mm and 6 mm, particularly between 0.35 mm and 5.5 mm, more particularly between 0.5 mm and 5 mm, preferably about 0.7 mm. In case of two cross-members (e.g., when two securing portions are available, one on each lateral side of the masking foil), the cross-members may have the same width or different widths.

As illustrated in FIGS. 2, 3, 4 and 5 the front side 28 of the masking foil 26 is disposed in front of the cutting edges 15 toward the front edge 20 of the shaving cartridge 10, and the back side 30 of the masking foil 26 is disposed in back of the cutting edges 15 toward the rear edge 22. The at least one ribbon 32 (in the figures even up to six ribbons, in other examples not shown possibly even more) and the first securing portion 34 at least partially cover the cutting edges 15 of the at least two blades 12 (in the figures even up to five blades are covered, and in general possibly even more than five). A shaving cartridge generally comprises at least two blades, and it can have more than two blades. FIGS. 2 to 5 depict shaving cartridges with five blades. The securing portions 34 of the masking foil may cover the blades 12 along a transversal axis Y-Y from the front edge 20 to the rear edge 22 of the shaving cartridge 10. The transversal axis Y-Y can be perpendicular to the axis X-X that is parallel to the blade edge(s). Further, the front bent portion 29 and the back bent portion 31 are directed toward the bottom surface 18 of the shaving cartridge 10.

Figure 9:
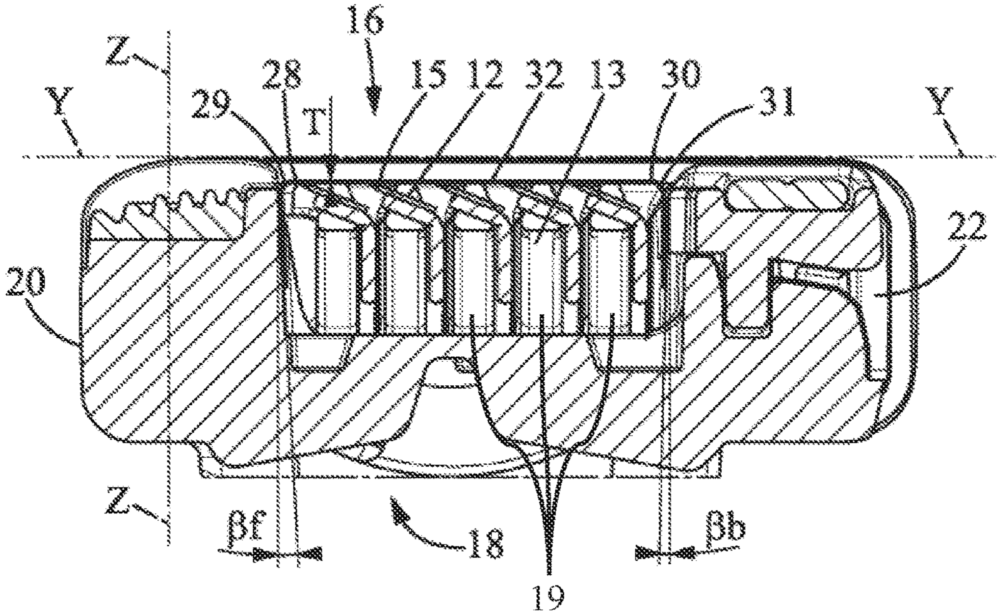
FIG. 9 is a cross-sectional view of a shaving cartridge according to the disclosure.

The front anchorage area 29*a* and the back anchorage area 31*a* each may form an angle with the axis Z-Z. The two angles can be equal or different. FIG. 9 shows that the angle $\beta_b$ between the back anchorage area 31*a* and the axis Z-Z may be smaller than the angle $\beta_f$ between the front anchorage area 29*a* and the axis Z-Z. This difference may allow an easy assembly between the masking foil 26 and the housing 13. For example, the angle $\beta_f$ between the front anchorage area 29*a* and the axis Z-Z and the angle $\beta_b$ between the back anchorage area 31*a* and the axis Z-Z may be comprised between 0° and 25°.

The shaving cartridge 10 of FIGS. 2 and 3 according to the present disclosure further comprises a first blade retainer 36. The first blade retainer 36 is located at one of the pair of side edges 24, toward the top surface 16 and is configured to cover the blades 12 such as to retain the blades 12 in the housing 13. The shaving cartridge 10 may further comprise a second blade retainer 36 located at the other one of the pair of side edges 24, toward the top surface 16 and configured to cover the at least three blades 12 such as to retain the at least three blades 12 in the housing 13.

Figure 8:
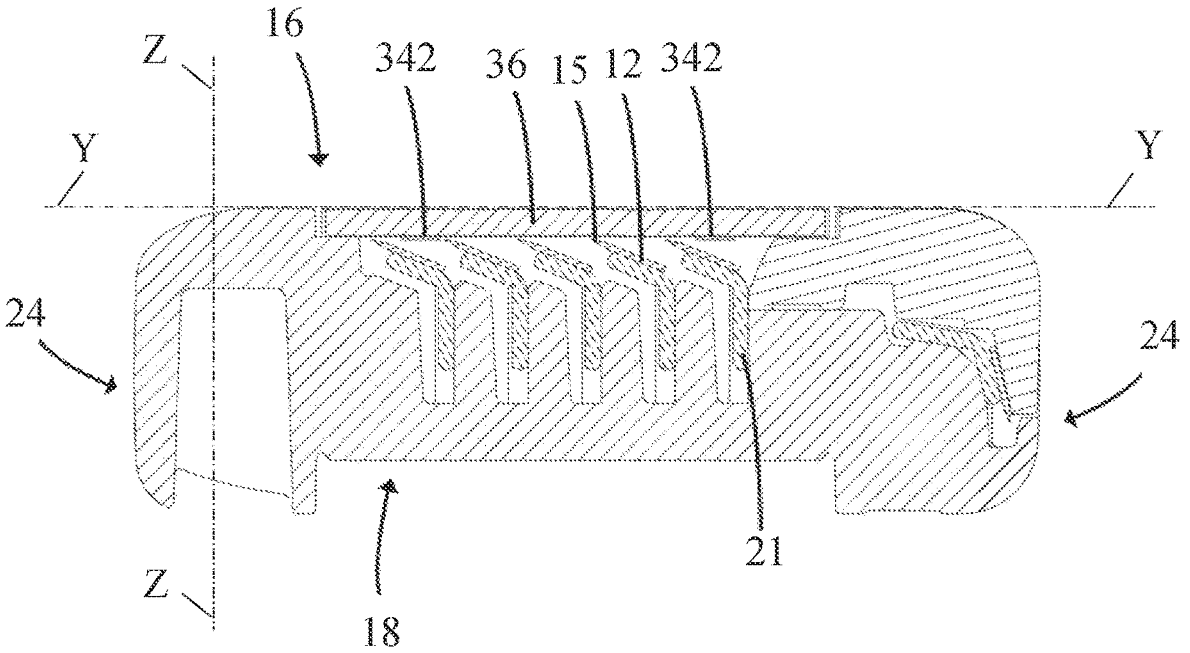
FIG. 8 is a cross-sectional view at a side edge of a shaving cartridge according to the disclosure.

As best illustrated in FIGS. 2, 4, 5 and 8, the two securing elements 342 of the first securing portion 34 are inserted below the first blade retainer 36 such as to maintain the masking foil in the housing 13. It is to be noted that at least one of the two securing elements 342 is hereby inserted in the inter-blade span IBS. The inter-blade span IBS is defined by the spacing between two adjacent cutting edges (see FIG. 10). For shaving cartridges comprising more than two blades, the inter-blade span IBS between two adjacent cutting edges may be constant or may vary. The inter-blade span IBS is further detailed below. FIG. 8 further illustrates that the cutting edges 15 are in contact with a bottom surface of the first blade retainer 36. When a second blade retainer 36 is available on the other one of the pair of side edges, the cutting edges 15 are configured to get in contact with a bottom surface of the second blade retainer 36.

The securing elements 342 may further be configured to be elastically and/or plastically deformable such as to spring-mount the masking foil 26 in the housing 13. As illustrated in FIG. 8, the securing elements 342 are in contact with the blade retainer 36 such as to hold the masking foil 26 assembled with the housing 13. This may for example be reached by the angle $\Omega_u$ formed by the securing elements 342 with the top side 8 of the masking foil 26, as described above. The securing elements 342 may first allow the assembly of the masking foil 26 in the housing 13 and then may recover when the masking foil 26 is removed from the housing 13 or alternatively may be permanently deformed. An elastic deformation allowing a recovery of the initial shape is preferred to maintain the spring effect when mounted. Due to the thin thickness of the foil material (see below the description of the material used), the securing elements 342 can get easily elastically or permanently deformed during the assembly process and gain a slight inclination that will also stabilize more the foil within the shaver head. Alternatively, in an example not shown, the securing elements may be bent downwardly to form an angle $\Omega_d$ with the top side of the masking foil. In this configuration, the upper surface of the masking foil may be situated above the retaining surface (which generally is the bottom surface of the blade retainer, which is in contact with the securing elements) of the blade retainer, by the thickness of the masking foil in the area of the cross-member. In other examples not shown, some of the securing elements may be bent upwardly and some may be bent downwardly.

FIGS. 2 to 5 and FIG. 8 illustrate five blades 12 and two securing elements 342. In these figures, the blade the closest to the front edge may be the first blade; the second blade may be the blade adjacent to the first blade; the third blade may the one adjacent to the second blade; the fourth blade may be the one adjacent to the third blade and the fifth blade may be the one adjacent to the fourth blade. The first inter-blade span may be the one between the cutting edges of the first and second blades, the second inter-blade span the one between the second and the third blades, and so on. In total, the configuration of these figures comprises four inter-blade spans. As depicted in FIGS. 2 to 5 and 8, at least one of the two securing elements 342 is inserted in an inter-blade span (in these figures concretely in the first inter-blade span), while the other one of the two securing elements 342 may be arranged in the back of the cutting edge 15 of the blade 12 which is arranged close to the rear edge 22 (i.e. the last blade; in these figures concretely the fifth blade). Alternatively, in an example not shown, the two securing elements may be inserted in two different inter-blade spans, for instance and preferably in the first and the last inter-blade span. In another example wherein the masking foil comprises three securing elements, the securing elements may be arranged in the first, the third and the fifth inter-blade spans. Alternatively, the three securing elements may be arranged in any other inter-blade spans, respecting the fact that each securing element is always arranged in a different inter-blade span than the other securing elements. In an example of a shaving cartridge comprising two blades and a masking foil with two securing elements, at least one of the two securing elements in arranged in the inter-blade span, while the other one of the two securing elements is arranged in the back of the cutting edge of the blade which is arranged close to the rear edge. The choice of inter-blade span(s) in which the securing elements are arranged has a direct influence on the introduction and repartition of the forces of the blades and/or the blade retainer(s) on the masking foil, particularly during shaving. It is therefore from relevance to distribute as best and as equal as possible the securing elements among the inter-blade spans and the space in back of the last blade.

In some examples, the inter-blade span IBS may be in a range of 0.4 mm to 6 mm, particularly in a range of 1 mm to 4 mm, more particularly in a range of 1.2 mm to 2.2 mm. In some examples, several different inter-blade spans IBS may be available on the same shaving cartridge. In some examples, the inter-blade span may be the same for all adjacent cutting edge spacings. Therefore, the form and width of the securing element is configured to be inserted within the corresponding inter-blade span IBS. The width of a securing element may be the maximal distance between its furthest lateral sides (lateral with reference to the securing element means the side that faces the front side and the side that faces the back side) and may be in a range of 0.4 mm to 6 mm, particularly in a range of 1 mm to 4 mm, more particularly in a range of 1.2 mm to 2.2 mm.

Generally, any combination of two or more (at least two) securing elements 342 and two or more blades 12 are possible as long as following is fulfilled: the number of securing elements 342 extending from the cross-member 341 of the first securing portion 34 may be at maximum equal to the number of blades 12, and/or the number of securing elements 342 extending from the cross-member 341 of the second securing portion 34 may be at maximum equal to the number of blades 12. In some examples, the number of securing elements 342 of the first securing portion 34 and the number of securing elements 342 of the second securing portion 34 may be different. In other examples, the number of securing elements 342 of the first securing portion 34 and the number of securing elements 342 of the second securing portion 34 may be equal. In general, one securing element is configured to be inserted in one inter-blade span IBS formed by the cutting edges 15 of the blades 12. The securing elements 342 may be inserted in adjacent inter-blade spans IBS or be equally (i.e., evenly) distributed among and within the inter-blade spans IBS (e.g., with three securing elements and five blades, the securing elements may be inserted in the inter-blade spans at the sides and the in the in the middle, leaving the ones respectively in the middle empty). Alternatively, the securing elements 342 may be randomly distributed among and within the inter-blade spans IBS. In still another alternative, one of the securing elements may be arranged behind the cutting edge of the latest blade, i.e. in the back of the cutting edge of the blade which is arranged close to the rear edge of the shaving cartridge. The more the number of securing elements 342 is close to the number of inter-blade spans, the most the assembly security of the masking foil into the shaving cartridge is improved.

It is also to be noted that the repartition of the securing elements on the cross-member, and therefore their location in the available inter-blade spans may have an influence on how the force exerted by the blades on the masking foil once assembled and during shaving will be distributed in the masking foil, and particularly in the securing portion. In fact, an even and equal distribution of the securing elements along the cross-member allows for an even force distribution in the securing element when the force exerted by the (e.g., spring-loaded) blades on the bottom surface of the masking force is evenly distributed along the securing element. The more securing elements are available on the securing portion, the more the force may be distributed among the securing elements. This may lead to an optimised sizing of the securing portion, and particularly the securing elements of the masking foil. Additionally, the counter-acting force of the blade retainer on the top surface of the securing elements need to be considered. As will be described further below, the blades may be arranged in any other configuration within the housing, which may lead to an uneven force entry onto the securing portions. The design, localisation on the cross-member and sizing of the securing elements may therefore be adapted to the blade's configuration and the housing in which it will be assembled.

During assembly, the masking foil may first be assembled on the blades and then secured with the blades by the retainer. In another example, the masking foil may be assembled to the shaving cartridge after the retainer has been assembled on the blades. For this, the flexibility of the securing elements permits the assembly of the masking foil below the retainer by bending the securing elements, which will pre-stress the blades in the housing. Therefore, the masking foil can be assembled in an already assembled shaving cartridge (or shaver head), industrially or by the final user with e.g., a special jig, through slight elastic deformation of the securing elements of the masking foil and/or the masking foil just before its attachment in the housing.

An advantage with the current masking foil is that a way of securing the masking foil without affecting blade edges exposures or the springs pre-stressing is provided. This is particularly useful in the cases in which a blade masking foil is to be assembled in a current production shaver head that includes blades as described herein, i.e., blades welded on a bent support or bent blades that are supported or not on spring fingers. Additionally, the securing portion allows for a proper assembly of the masking foil into the cartridge.

Figure 4:
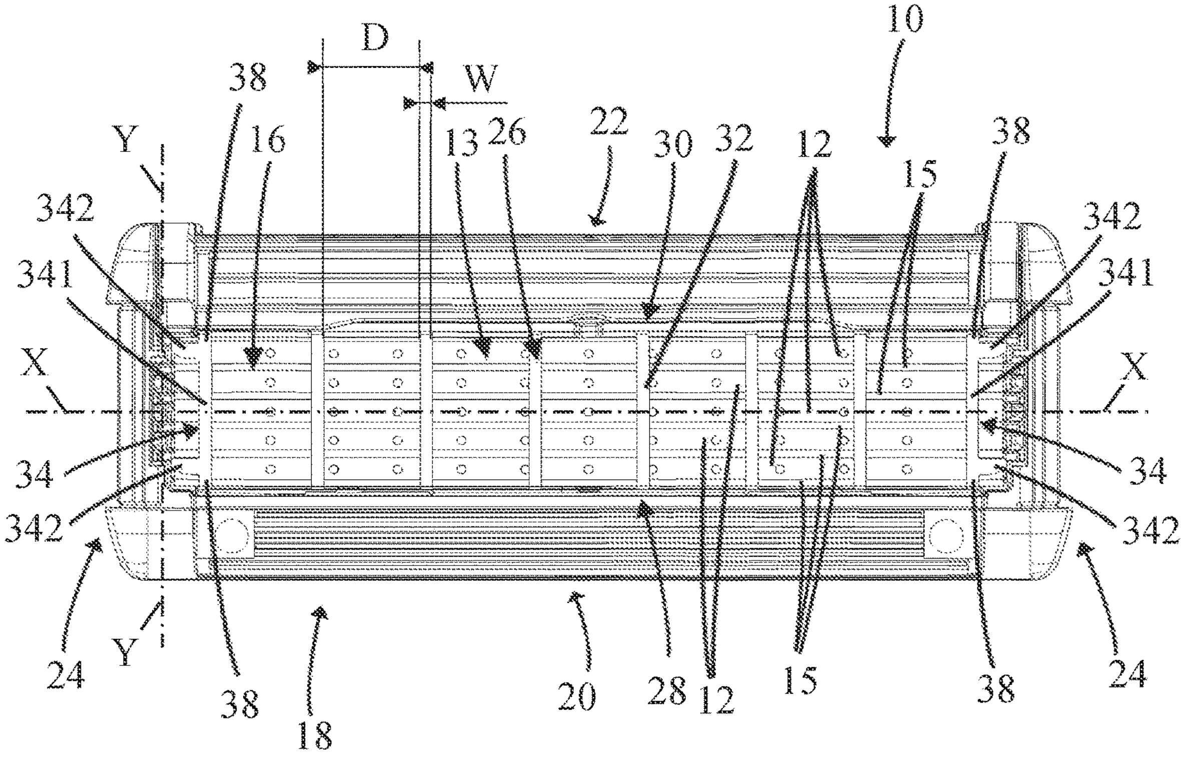
FIG. 4 is a top view of the shaving cartridge of FIG. 2, the blade retainer being removed.
Figure 5:
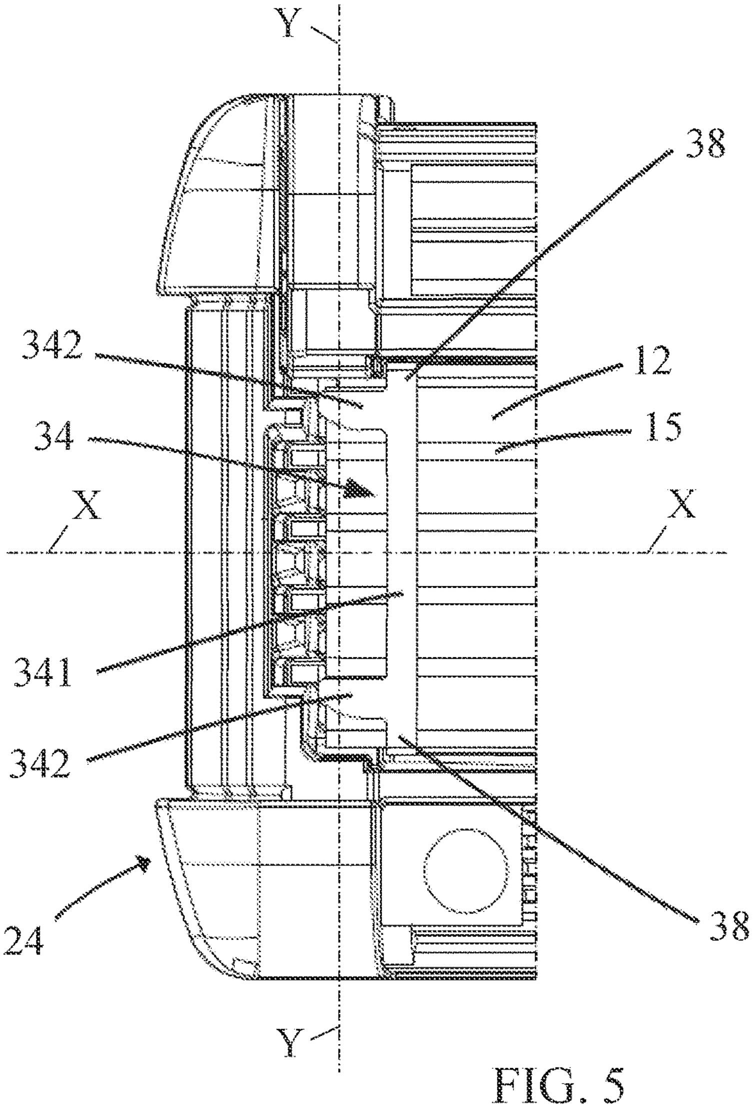
FIG. 5 is a partial top view of FIG. 4 illustrating the securing portion in the shaving cartridge as of FIG. 2, the retainer being removed.

As described above, the masking foil 26 comprises at least one ribbon 32. In FIGS. 2 and 4, the masking foil 26 may comprise six ribbons 32, but the disclosure may not be limited to this number of ribbons. Each ribbon 32 extends transversally between the front side 28 and the back side 30 of the masking foil 26. An angle α, view from the top as shown in FIG. 4, may define the inclination of each ribbon between the longitudinal axis X-X and the ribbon 32. This angle α may be comprised between 45° and 90° and may vary from one ribbon to another one on the same masking foil. More particularly, the angle α may be comprised between 15° and 90°. As for example illustrated in FIGS. 2, 3 and 4, the angle α may be approximatively 90°. The ribbon(s) 32 and the securing portion(s) 34 at least partially cover the cutting edges 15 of the blades 12.

Each ribbon 32 is connected to a front anchorage area **29*a* via a front bent portion 29 and to a back anchorage area 31*a* via a back bent portion 31 as visible for instance in FIGS. 3, 6 and 7. These two bent portions 29, 31 may provide rigidity to the ribbons 32 when shaving. Each anchorage area 29*a*, 31*a* may be directed toward the bottom surface 18 of the housing, approximatively along a transversal axis Z-Z from the top surface 16 to the bottom surface 18 of the cartridge 13. Each anchorage area 29*a*, 31*a* may be in an extension of the respective bent portion 29, 31. The anchorage areas 29*a*, 31*a* may not be attached. Thus, when the shaving cartridge 10 comprises movable blades 12, the geometry of the masking foil 26 may allow the movements of the masking foil 26 along with the movement of the movable blades 12**.

In other words, the masking foil 26 can be movable in the housing due to the forces applied by the skin and hair during shaving action. The masking foil 26 may be removably assembled within the housing 13 of the shaving cartridge 10. Therefore, in comparison with a masking foil which may not follow the movement of the blades 12, the masking foil 26 may increase the adaptability of the blades 12 and the shaving surface of the skin of the user which may be in contact with the masking foil 26. In addition, the blades 12 can move in the cartridge 10 without compromising the closeness during shaving action.

As depicted in FIG. 9, the shape of the ribbon 32, in the covered area, may be flat viewed in a cross sectional view. Its thickness T may be measured along the axis Z-Z from the side of the top surface 16 to the side of the bottom surface 18. The thickness T can be comprised between 20 μm and 5000 μm. In particular, the thickness T may be comprised between 40 μm and 60 μm. The thickness T may be for example of about 50 μm.

Besides that, the coverage percentage of the ribbons 32 can be comprised between 1% and 70%. In particular, the coverage percentage of the ribbons 32 may be comprised between 5% and 20%. For example, when the masking foil 26 comprises six ribbons 32, the coverage percentage of the masking foil 26 by the ribbons 32 may be of about 20%. The ribbons 32 may be parallel to each other, transversally between the front side and the back side of the masking foil. The distance D (shown in FIG. 4) may be defined as the perpendicular segment between the lateral sides of two adjacent ribbons 32 and/or between the lateral sides of the cross-member 341 of the securing portion 34 and the adjacent ribbon 32. The width W of a ribbon 32 may be the distance between its two lateral sides. The distance D depends on the number of ribbons comprised in the masking foil. As the number of ribbons can vary between one and e.g., ten (or more), the distance D may vary significantly. The distance D can therefore be comprised between 0.2 mm and 40 mm. The distance D between the ribbons may be constant or, alternatively, may vary over the number of ribbons. Similarly, the width of the ribbons may depend on the number of ribbons on the masking foil in combination with the coverage degree expected. The width W can therefore be comprised between 0.2 mm and 10 mm. The width W may be constant or, alternatively, may vary over the number of ribbons.

Viewed from the side, the ribbons of the masking shape can have different shapes. As illustrated in FIG. 9, the shape of the ribbons may be flat. In other examples not shown, the shape of the ribbons viewed from the side may be curved, corrugated, provided with one or more grooves, any combination thereof or any other shape that allows the skin to be shaved in an efficient manner. Depending on the shape of the ribbons, the blades may provide a different exposure with respect to the shaving plane S. The cutting edges may have an exposure between −200 μm to +200 μm.

As depicted in FIG. 3, each blade 12 may be borne by a bent support 21. In another aspect not shown, the blade(s) may comprise a cutting edge portion, a base portion and a bent portion intermediate the cutting edge portion and the base portion, which may be integrally formed. The blades may all be directed toward the front side (direction) when inserted in the housing, as illustrated in the figures referenced by this disclosure. In other examples not shown, some or all blades may be oriented towards the rear side (direction) of the shaving cartridge.

In another example not shown, the blade(s) may not be borne by a bent support 21 and be welded below the masking foil. Therefore, the masking foil can act as a shield for the blades.

In the configurations where the blades 12 are movable, the shaving cartridge 10 may comprise spring-loaded fingers 19 (shown for example in FIG. 9). The movement of the masking foil 26 may be therefore indirectly managed by the spring-loaded fingers 19. In another example, when the masking foil is not fixedly mounted in the housing and does not cover partially the cutting edge of all the blades, the blades that are uncovered by the masking foil can be movable, or fixedly (i.e. non-movably) mounted in the housing. Moreover, each cutting edge may have different exposure, between −200 μm to +200 μm. In addition, the masking foil may improve hair removal and reduce nicks and cuts during shaving. The other examples and figures disclosed in this document may also comprise spring-loaded fingers that allow the blades to be movable within the housing.

Regardless of the fact that the blades can be movably or non-movably arranged in the housing, the front and the back anchorage areas may be attached in the housing and the masking foil can act as a blade retainer. Indeed, when the blades are movable, the blades can move toward the bottom surface during shaving. When the blades move toward the top surface to return to their rest position (non-shaving), the movement of the blades may be stopped by stumbling against the masking foil.

In examples not shown, the masking foil may present different patterns viewed from the top of the shaving cartridge. Depending on the pattern, the angle α between the front side (and/or the back side) and the ribbon may not be equal to 90°. In one example, the ribbons may all be oriented in the same direction with an angle α different than 90°. In other examples, all the ribbons may be oblique but not oriented in the same direction; the ribbons may extend transversally between the two side edges; the ribbons may be oriented according to a circumferential direction; the ribbons may form a skin contacting surface with a hexagonal shape, like a honeycomb; the ribbons may comprise several circular shapes; the pattern may be rhomboidal; the pattern may include an intermediate portion from which the ribbons extend; and many other patterns such as the patterns disclosed in context with the embodiments of FIG. 12 of US 2019/0255720 A1, which is incorporated herewith in its entirety. In any of these examples and others not disclosed, the ribbons may or may not contact the securing portion(s). The listed examples should not be limiting; any combination of number of ribbons and of their inclination angle can be provided on the masking foil.

Each pattern of the masking foil can manage differently the direction of the hairs in relation to the cutting edge. The oblique ribbons may for example provide hair cutting effect which may improve shaving comfort during shaving. Any orientation of the ribbons may change the interaction of the shaver head with the skin and may improve shaving comfort and reduce the skin friction. The above orientations may alter the way that the shaver head interacts with the skin, thus improving skin management and shaving comfort and reducing the head to skin friction. For example, diverging ribbons may further stress the skin, creating thus a smoother skin terrain with less friction.

The masking foils disclosed in this document (e.g., in FIGS. 6 and 7) can be made by using several methods, such as photo etching, laser cutting, stamping, electrical discharge machining, water jet cutting or electroforming. For example, the masking foil can be made of a flat strip of material. The strip may have an upper portion and a lower portion. The material is chosen among plastic material, composite, aluminium, aluminium alloys and/or noble metals chosen among gold or platinum. The strip material may be stamped to perform holes in the strip, forming the pattern of the masking foil. After stamping, the masking foil may be bent. The bending station may comprise a slot which receives the strip. The upper portion and the lower portion of the strip project outside of the slot. The upper portion and the lower portion may be bent inwardly about a bending axis, forming a front bent portion and a back bent portion of the masking foil. The front bent portion and the back bent portion of the masking foil may have the same or different radius of curvature. The internal radius of curvature can be in a range between 0.02 mm to 1 mm. Alternatively, the bent areas may not form any curvature but form sharp edges, or close to sharp edges. The masking foil may be formed of welded parts. In other examples not shown, the side edges of each ribbon may be grinded or electrochemically etched, providing additional cutting edges of different profiles.

The masking foil according to the present disclosure can be made of a conductive and/or non-conductive material selected from a group consisting of stainless steel, plastic material, composite, aluminium, aluminium alloys, noble metals such as e.g., gold or platinum and/or any combination thereof. Since the blade retainer, which comprises aluminium, is in direct contact with the blades, the masking foil can be made of any conductive or non-conductive material and/or coating and the cathodic protection offered by the blade retainer to the blades will be preserved.

In order to enhance functionality of the masking foil, it can comprise a wound healing and/or an anti-bacterial agent and/or coating. Wound healing material components or agents can for example be hydrocolloids, hydrogels, polycaprolactone (PCL), natural polymer films (as wound dressing), bioactive dressings made from natural polymers and skin substitutes containing allogenic live fibroblasts. Antibacterial agents can for example be obtained using silver ion antimicrobial technology. Silver ion antimicrobial technology may be a silver-based active ingredient that can be incorporated e.g. into polymers, coatings, textiles and more to offer continuous product protection against bacterial growth. The masking foil can also comprise a lubricating coating, such as hydrophobic or hydrophilic, such as polyfluorocarbon, for example polytetrafluoroethylene (PTFE), or hydrogel coating. This coating may provide a reduction of the friction between the shaving cartridge and the skin.

The masking foil can also have color properties. For instance, different colors can be provided on the masking foil in order to distinguish the male or female utilization. For instance, the masking foil can be blue when intended to a man shaving razor, and red or pink when intended to a woman shaving razor. The masking foil can also be provided with a material which may have properties allowing a changing of the color after a particular number of uses. For instance, the masking foil can be green when never utilized and red when worn.

In another example, in order to improve adaptability of the masking foil on skin contours, the masking foil may be placed above the top surface of the shaving cartridge. The bent portions may be wrapped around the front edge and the rear edge, extending toward the bottom surface of the shaving cartridge. The masking foil may act as a blade retainer.

In another example, the masking foil may be flexible. Through the creation of a masking foil that may be thick enough to be flexible to adapt to face contours, the masking foil can act as a flexible casing for the blades. For example, by making a centre of the masking foil fixed and free to pivot, the blades can follow inwards or outwards the contours of the face. The movement of the masking foil may be initiated by the continuous exertion of force by the elastic fingers. The masking foil that may be hinged at its centre by the shaving cartridge may have the tendency to be lifted upwards by the elastic fingers. Depending on the face contours the shaving plane may self-adjust accordingly.

In another example, the masking foil may be welded to the blade retainer. For example, the securing portion(s) may be welded with the corresponding blade retainer, enhancing the attachment of the masking foil to the shaving cartridge.

The disclosure may not be limited to the previous features. In other examples not shown but disclosed in detail in US 2019/0255720 A1, which is incorporated herewith in its entirety, the masking foil may not extend parallel to the axis Y-Y, but the exposure of the blades may be progressive to reduce the friction between the shaving cartridge and the skin during shaving; the masking foil may comprise a plastic cover; the front and back anchorage areas may comprise holes that cooperate with pins in the housing, such that the masking foil may be fixed to the housing; the blades may stepwise form two or more different exposures and the masking foil follows these exposures to improve the gliding effect and reduce nicks and cut irritations during shaving; the masking foil may comprise a joint to permit a pivot movement of the masking foil within the housing along an axis parallel to the X-X axis, which may offer a more constrained way of how the blades may move during shaving and may lead to a good adaptability of the blades on the surface to shave, thereby improving shaving performance; the thickness T of the ribbon may be progressive along the ribbon such that the masking foil may have a better interaction with the skin, minimize the friction between the shaving cartridge and the skin, and provide a more efficient and closer hair removal; the thickness T of the ribbon may change stepwise such as to improve the hair removal or provide the possibility to trim the hairs; slots in the housing may allow the masking foil to move upwards and downwards such as to provide a better shaving on difficult areas of the skin and improve the hair removal; the ribbons may have protrusions to stabilise the blades and reduce nicks, cuts and irritations during shaving; the securing portions may have fingers oriented toward the bottom surface in the Y-Y axis and contacting the blades such as to reduce the skin friction during shaving and improve the rinsing of the shaving cartridge; the masking foil may be made two layers of two materials to allow deformation e.g. due to the effect of heat; the shaving razor may be provided with heating means; the masking foil may comprise different materials on its different elements for example to allow for a certain heat (and/or electric) conductivity in certain regions of the masking foil; the masking foil may comprise an inner channel connected to a generator via the front and back anchorage areas and permitting e.g. steam or lubrication diffusion through the channel to the shaving surface; the masking foil may comprise a cover having flexible properties to hide or deactivate the use of the covered blades; the masking foil may have displacement means to set the distance D between each ribbon, such as to adjust the shaving cartridge to skin friction and the rinsing of the shaving cartridge; the ribbons may comprise bristles, which may provide a soft contact with the skin during shaving and/or a massage of the skin during shaving; the masking foil may comprise corrugations that may comprise a lubricant or a shaving aid element; the ribbon may comprise pikes as shark fins providing a dermodynamic feature, improving the gliding effect of the shaving razor on the skin during shaving; the masking foil may have an organic pattern that may follow the skin contours and guide the hair smoothly such as to provide a better hair alignment, a smoother shaving and a better hair removal; the ribbons may comprise sphere shaped protrusions to provide a massage of the skin during shaving; the ribbons may comprise rounded protrusions to eliminate the bulging effect that may happen during the shaving; the ribbons may comprise extruded protrusions that have a rectangular or a conical shape with the effect to improve hair removal and reduce nicks, cuts and irritations during shaving; the ribbons may comprise small barbs that may provide a mechanical exfoliation (e.g. sebum removal) of the skin during shaving; the handle and the cartridge may comprise a vibrating means connected to the masking foil.

In this disclosure, the expression "connected to" is not limited to a direct connection between two objects (i.e., it is not required that the two objects abut). For instance, a first object and a second object can be indirectly connected through a third object. Further, the term "edge" refers to a boundary limiting an object. This does not necessarily mean that there is a material boundary.

Although the present disclosure has been described above and is defined in the attached claims, it should be understood that the disclosure may alternatively be defined in accordance with the following embodiments:

1. A masking foil (26) for a shaving cartridge comprising:
   a front side (28);
   a back side (30);
   a pair of lateral sides (9);
   at least one ribbon (32) extending along a top side (8) of the masking foil (26) between the front side (28) and the back side (30); and
   a first securing portion (34) located at one of the pair of lateral sides (9);
   characterised in that the first securing portion (34) comprises a cross-member (341) extending along the top side (8) of the masking foil (26) between the front side (28) and the back side (30), and at least two securing elements (342) extending laterally outwardly from the cross-member (341).
2. The masking foil (26) according to embodiment 1, wherein the at least one ribbon (32) comprises:
   a front bent portion (29) extending from the ribbon (32) downwardly at the front side (28); and
   a back bent portion (31) extending from the ribbon (32) downwardly at the back side (30).
3. The masking foil (26) according to embodiment 2, further comprising:
   a front anchorage area (29*a*) located at the front side (28); and
   a back anchorage area (31*a*) located at the back side (30);
   wherein the front bent portion (29) of the at least one ribbon (32) is connected to the front anchorage area (29*a*), and wherein the back bent portion (31) of the at least one ribbon (32) is connected to the back anchorage area (31*a*).
4. The masking foil (26) according to any of the preceding embodiments, further comprising a second securing portion (34) located at the other one of the pair of lateral sides (9), wherein the second securing portion (34) comprises a cross-member (341) extending along the top side (8) of the masking foil (26) between the front side (28) and the back side (30), and at least two securing elements (342) extending laterally outwardly from the cross-member (341).
5. The masking foil (26) according to embodiment 4, wherein the cross-member (341) comprises two joining members (38), wherein the two joining members (38) are configured to respectively connect the cross-member (341) to the front anchorage area (29*a*) and to the back anchorage area (31*a*).
6. The masking foil (26) according to any of embodiments 4 to 5, wherein the securing elements (342) are in the form of fins, fingers, pins, tongues or any other form of the like.
7. The masking foil (26) according to any of embodiments 4 to 6, wherein the securing elements (342) are bent upwardly to form an angle ($\Omega_u$) with the top side (8) of the masking foil (26).
8. The masking foil (26) according to embodiment 7, wherein the angle ($\Omega_u$) is in a range of 0° to 10°, particularly in a range of 0.05° to 8°, more particularly in a range of 0.1° to 5°.
9. The masking foil (26) according to any of embodiments 4 to 6, wherein the securing elements (342) are bent downwardly to form an angle ($\Omega_d$) with the top side (8) of the masking foil (26).
10. The masking foil (26) according to embodiment 9, wherein the angle ($\Omega_d$) is in a range of 0° to 10°, particularly in a range of 0.05° to 8°, more particularly in a range of 0.1° to 5°.
11. The masking foil (26) according to any of embodiments 4 to 10, wherein the securing elements (342) are elastically deformable in the up-and-down direction.
12. The masking foil (26) according to any of embodiments 4 to 11, wherein a width of the securing elements (342) is in a range of 0.4 mm to 6 mm, particularly in a range of 1 mm to 4 mm, more particularly in a range of 1.2 mm to 2.2 mm.
13. The masking foil (26) according to any of embodiments 4 to 12, wherein a length of the securing elements (342) is in a range of 0.5 mm to 10 mm, particularly in a range of 0.7 mm to 8 mm, more particularly in a range of 1 mm to 6 mm.
14. The masking foil (26) according to any of the preceding embodiments, wherein the masking foil (26) is made of a conductive and/or non-conductive material selected from a group consisting of stainless steel, plastic material, composite, aluminium, aluminium alloys, noble metals, and/or any combination thereof
15. The masking foil (26) according to any of the preceding embodiments, further comprising a wound healing and/or an antibacterial agent.
16. The masking foil (26) according to any of the preceding embodiments, further comprising a lubricating coating.
17. A shaving cartridge (10) comprising:
   a housing (13) comprising:
      a top surface (16);
      a bottom surface (18);
      a front edge (20);
      a rear edge (22);
      a pair of side edges (24) extending between the front edge (20) and the rear edge (22); and
   at least two blades (12) disposed between the front edge (20) and the rear edge (22), wherein each of the at least two blades (12) comprises a cutting edge (15) extending toward the top surface (16) and at an angle toward the front edge (20), wherein the at least two blades (12) are movable in an-up-and down direction in the housing (13), and wherein the spacing between the two adjacent cutting edges (15) defines an inter-blade span (IBS);

a first blade retainer (36) located at one of the pair of side edges (24), toward the top surface (16) and configured to cover the at least two blades (12) such as to retain the at least two blades (12) in the housing (13); and a masking foil (26) according to any of embodiments 1 to 16, wherein the front side (28) is disposed in front of the cutting edges (15) toward the front edge (20), and the back side (30) is disposed in back of the cutting edges (15) toward the rear edge (22), wherein the at least one ribbon (32) and the first securing portion (34) at least partially cover the cutting edges (15) of the at least two blades (12), wherein the front bent portion (29) and the back bent portion (31) are directed toward the bottom surface (18), wherein the at least two securing elements (342) are configured to be inserted below the first blade retainer (36) such as to maintain the masking foil in the housing (13), and wherein at least one of the at least two securing elements (342) is configured to be inserted in the inter-blade span (IBS).

18. The shaving cartridge (10) according to embodiment 17, wherein the other one of the at least two securing elements (342) is configured to be arranged in the back of the cutting edge (15) of the blade (12) which is arranged close to the rear edge (22).

19. The shaving cartridge (10) according to any of embodiments 17 to 18, wherein the cutting edges (15) are configured to get in contact with a bottom surface of the first blade retainer (36).

20. The shaving cartridge (10) according to any of embodiments 17 to 19, further comprising a second blade retainer (36) located at the other one of the pair of side edges (24), toward the top surface (16) and configured to cover the at least two blades (12) such as to retain the at least two blades (12) in the housing (13).

21. The shaving cartridge (10) according to embodiment 20, wherein the cutting edges (15) are configured to get in contact with a bottom surface of the second blade retainer (36).

22. The shaving cartridge (10) according to any of embodiments 17 to 21, wherein the masking foil (26) is removably assembled within the housing (13) of the shaving cartridge (10).

23. The shaving cartridge (10) according to any of embodiments 17 to 22, wherein the securing elements (342) are configured to be elastically deformable such as to spring-mount the masking foil (26) in the housing (13).

24. The shaving cartridge (10) according to any of embodiments 17 to 23, wherein the number of securing elements (342) extending from the cross-member (341) of the first securing portion (34) is at maximum equal to the number of blades (12).

25. The shaving cartridge (10) according to any of embodiments 17 to 24, wherein the number of securing elements (342) extending from the cross-member (341) of the second securing portion (34) is at maximum equal to the number of blades (12).

26. The shaving cartridge (10) according to any of embodiments 17 to 25, wherein the number of securing elements (342) of the first securing portion (34) and the number of securing elements (342) of the second securing portion (34) are equal.

27. The shaving cartridge (10) according to any of embodiments 17 to 25, wherein the number of securing elements (342) of the first securing portion (34) and the number of securing elements (342) of the second securing portion (34) are different.

28. A shaving razor assembly (11) comprising:

a shaving handle (14); and a shaving cartridge (10) according to any one of embodiments 17 to 27.

The invention claimed is:

1. A shaving cartridge comprising:

a housing comprising:

a top surface;

a bottom surface;

a front edge;

a rear edge;

a pair of side edges extending between the front edge and the rear edge; and at least two blades disposed between the front edge and the rear edge, wherein each of the at least two blades comprises a cutting edge extending toward the top surface and at an angle toward the front edge, wherein the at least two blades are movable in an up-and-down direction in the housing, and wherein a spacing between the two adjacent cutting edges defines an inter-blade span (IBS);

a first blade retainer located at one of the pair of side edges, toward the top surface and configured to cover the at least two blades such as to retain the at least two blades in the housing; and a masking foil including:

a front side;

a back side;

a pair of lateral sides;

at least one ribbon extending along a top side of the masking foil between the front side and the back side, wherein the at least one ribbon comprises a front bent portion extending from the ribbon downwardly at the front side and a back bent portion extending from the ribbon downwardly at the back side; and a first securing portion located at one of the pair of lateral sides;

wherein the first securing portion comprises a cross-member extending along the top side of the masking foil between the front side and the back side, and at least two securing elements extending laterally outwardly from the cross-member, wherein the securing elements are bent upwardly to form an angle with the top side of the masking foil, the angle being in a range of 0.1° to 10°, wherein the front side is disposed in front of the cutting edges toward the front edge, and the back side is disposed in back of the cutting edges toward the rear edge, wherein the at least one ribbon and the first securing portion at least partially cover the cutting edges of the at least two blades, wherein the front bent portion and the back bent portion are directed toward the bottom surface, wherein the at least two securing elements are configured to be inserted below the first blade retainer such as to maintain the masking foil in the housing, and wherein at least one of the at least two securing elements is configured to be inserted in the inter-blade span (IBS) such that the at least one of the two securing elements is sandwiched between the cutting edge of a first blade of the two blades and the cutting edge of a second blade of the two blades.

2. The shaving cartridge according to claim 1, further comprising:

a front anchorage area located at the front side; and a back anchorage area located at the back side;

wherein the front bent portion of the at least one ribbon is connected to the front anchorage area, and wherein the back bent portion of the at least one ribbon is connected to the back anchorage area.

3. The shaving cartridge according to claim 2, further comprising a second securing portion located at the other one of the pair of lateral sides, wherein the second securing portion comprises a second cross-member extending along the top side of the masking foil between the front side and the back side, and at least two second securing elements extending laterally outwardly from the cross-member.

4. The shaving cartridge according to claim 3, wherein the second cross-member comprises two second joining members, wherein the two second joining members are configured to respectively connect the second cross-member to the front anchorage area and to the back anchorage area.

5. The shaving cartridge according to claim 3, wherein the second securing elements are at least one of fins, fingers, pins, or tongues.

6. The shaving cartridge according to claim 3, wherein a width of the securing elements is in a range of 0.4 mm to 6 mm.

7. The shaving cartridge according to claim 3, wherein a length of the securing elements is in a range of 0.5 mm to 10 mm.

8. The shaving cartridge according to claim 1, wherein the masking foil is made of a conductive and/or non-conductive material selected from a group consisting of stainless steel, plastic material, composite, aluminum, aluminum alloys, noble metals, and/or any combination thereof.

9. The shaving cartridge according to claim 1, wherein the other one of the at least two securing elements is configured to be arranged in the back of the cutting edge of the blade which is arranged close to the rear edge.

10. The shaving cartridge according to claim 1, wherein the cutting edges are configured to get in contact with a bottom surface of the first blade retainer.

11. The shaving cartridge according to claim 1, further comprising a second blade retainer located at the other one of the pair of side edges, toward the top surface and configured to cover the at least two blades such as to retain the at least two blades in the housing, and/or wherein the cutting edges are configured to get in contact with a bottom surface of the second blade retainer.

12. The shaving cartridge according to claim 1, wherein the masking foil is removably assembled within the housing of the shaving cartridge, and/or wherein the securing elements are configured to be elastically deformable such as to spring-mount the masking foil in the housing.

13. The shaving cartridge according to claim 1, wherein a number of securing elements extending from the cross-member of the first securing portion is at maximum equal to a number of blades, and/or wherein the number of securing elements extending from the cross-member of a second securing portion is at maximum equal to the number of blades, and/or wherein the number of securing elements of the first securing portion and the number of securing elements of the second securing portion are equal, and/or wherein the number of securing elements of the first securing portion and the number of securing elements of the second securing portion are different.

14. A shaving razor assembly comprising:

a shaving handle; and a shaving cartridge according to claim 13.

15. The shaving cartridge according to claim 1, wherein the inter-blade span (IBS) is in a range of 0.4 mm to 6 mm.

16. The shaving cartridge according to claim 1, wherein a portion of one of the at least two securing elements is positioned underneath the cutting edge of the first blade and the first blade retainer.

17. The shaving cartridge according to claim 16, further comprising a front anchorage area located at the front side, the front anchorage area having a first extended portion, a second extended portion, a first retracted portion, and a second retracted portion, wherein the first retracted portion is located between the first extended portion and the second extended portion, wherein the second extended portion is located between the first retracted portion and the second retracted portion, and wherein the front bent portion of the at least one ribbon is connected to the front anchorage area.

18. A shaving cartridge comprising:

a housing comprising:

a top surface;

a bottom surface;

a front edge;

a rear edge;

a pair of side edges extending between the front edge and the rear edge; and at least two blades disposed between the front edge and the rear edge, wherein each of the at least two blades comprises a cutting edge extending toward the top surface and at an angle toward the front edge, wherein the at least two blades are movable in an up-and-down direction in the housing, and wherein a spacing between the two adjacent cutting edges defines an inter-blade span (IBS);

a first blade retainer located at one of the pair of side edges, toward the top surface and configured to cover the at least two blades such as to retain the at least two blades in the housing; and a masking foil including:

a front side;

a back side;

a pair of lateral sides;

at least one ribbon extending along a top side of the masking foil between the front side and the back side wherein the at least one ribbon comprises a front bent portion extending from the ribbon downwardly at the front side and a back bent portion extending from the ribbon downwardly at the back side; and a first securing portion located at one of the pair of lateral sides;

wherein the first securing portion comprises a cross-member extending along the top side of the masking foil between the front side and the back side, and at least two first securing elements extending laterally outwardly from the cross-member, wherein the first securing elements are bent downwardly to form an angle with the top side of the masking foil, the angle being in a range of 0.1° to 10°, and wherein at least one of the at least two first securing elements is sandwiched between the cutting edges of the at least two blades.

19. The shaving cartridge according to claim 18, wherein the front side is disposed in front of the cutting edges toward the front edge, and the back side is disposed in back of the cutting edges toward the rear edge, wherein the at least one ribbon and the first securing portion at least partially cover the cutting edges of the at least two blades, wherein the front bent portion and the back bent portion are directed toward the bottom surface, wherein the at least two first securing elements are configured to be inserted below the first blade retainer such as to maintain the masking foil in the housing, and wherein the cutting edges are configured to get in contact with a bottom surface of the first blade retainer.

20. The shaving cartridge according to claim 19, further comprising a second securing portion located at the other one of the pair of lateral sides, wherein the first securing portion includes exactly two first securing elements, wherein the second securing portion includes exactly two second securing elements, wherein the first securing elements and the second securing elements are fins, wherein the cutting edges are parallel to a first axis and the sides of the cutting edges are parallel to a second axis, and wherein the two first securing elements and the two second securing elements are further located between cutting edges such that the two first securing elements and the two second securing elements extend parallel to the first axis and transverse to the second axis.

* * * * *